UNITED STATES PATENT OFFICE.

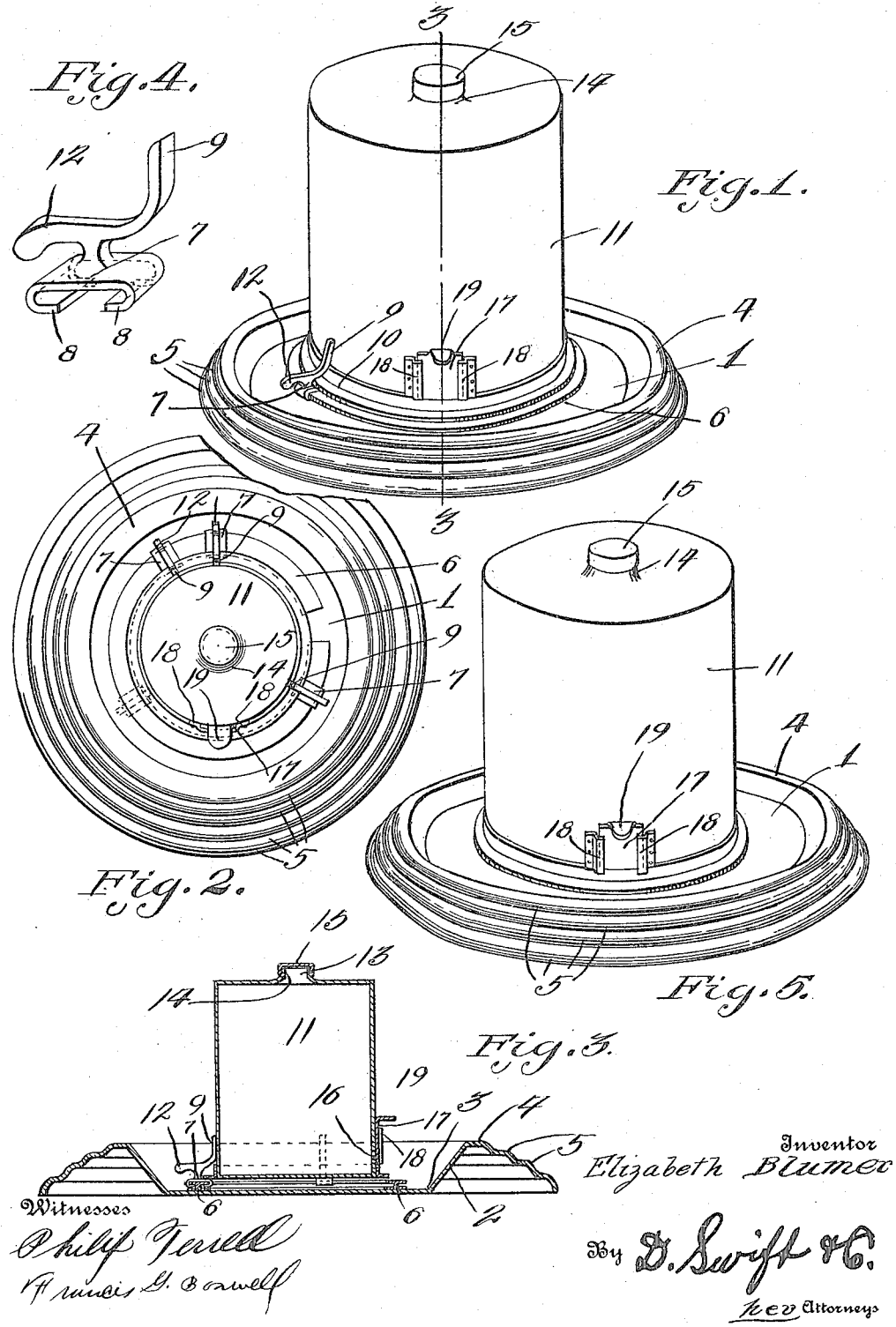

ELIZABETH BLUMER, OF ALBANY, WISCONSIN.

DRINKING-FOUNTAIN OR WATERER FOR FOWLS.

1,136,092.

Specification of Letters Patent.

Patented Apr. 20, 1915.

Application filed August 20, 1914. Serial No. 857,618.

*To all whom it may concern:*

Be it known that I, ELIZABETH BLUMER, a citizen of the United States, residing at Albany, in the county of Green and State of Wisconsin, have invented a new and useful Drinking-Fountain or Waterer for Fowls; and I do hereby declare the following to be a full, clear, and exact description of the invention, such as will enable others skilled in the art to which it appertains to make and use the same.

This invention relates to an improved drinking fountain or watering device for fowls and the like, and an object of the invention is to provide a device of this nature having improved features of construction.

One of the features of construction is the provision of means for detachably mounting the reservoir in the pan, which constitutes the fountain, so that the reservoir may be easily and quickly detached, whereby the same may be filled.

Another feature of the invention is the provision of a slide adapted to be adjusted to permit the water to gradually flow from the reservoir into the pan or fountain.

In practical fields the details of construction may necessitate alterations, falling within the scope of what is claimed.

The invention comprises further features and combination of parts, as hereinafter set forth, shown in the drawings and claimed.

In the drawings: Figure 1 is a view in perspective of the improved drinking fountain constructed in accordance with the invention. Fig. 2 is a plan view of the reservoir and the pan or fountain separated, showing the two in position ready to be connected. Fig. 3 is a sectional view on line 3—3 of Fig. 1. Fig. 4 is a detail view in perspective of one of the sliding clamps 7. Fig. 5 is a perspective view of a drinking fountain, showing the clamps dispensed with.

Referring more especially to the drawings, 1 designates the pan or fountain provided with an annular flange 2, which rises upwardly and outwardly, as shown at 3, then outwardly and downwardly as shown at 4. The outwardly and downwardly extending portion 4 is provided with ridges or convolutions constituting foot-holds thereby rendering it easier to permit the chickens or other fowl to reach the water in the pan or fountain. These ridges or convolutions 5 may be pressed in the portion 4 of said flange. The pan is provided with a circular raised flange 6 T-shaped in cross section, on which are sliding clamps 7, the feet 8 of which are bent over and under the T-shaped portion of the flange 6, so as to fasten the clamps to the flange. By this arrangement the clamps 7 can slide annularly upon said flange 6. The overhanging arms 9 of the clamps overlie the peripheral flange 10 of the reservoir, car or tank 11, in which the water is deposited. The arms 12 of said clamps constitute hand-holds to be grasped, for adjusting or sliding one or the other of said clamps. There are three clamps, as shown, and by adjusting one or the other annularly upon the flange 6 toward one of the other clamps, the reservoir may be detached, not only for the purpose of refilling the reservoir, but also for permitting the bottom of the reservoir and the bottom of the pan or fountain, especially about the flange 6 and said clamps, to be thoroughly cleaned, thereby insuring perfect sanitation, which is another particular object of the invention. Another object for detachably mounting or connecting the reservoir upon the pan is to hold the reservoir concentric or centrally disposed with relation to the pan or fountain. The reservoir 11 may be easily detached, and carried to a pump, well, or to some larger reservoir or tank for filling, and in case the pump or the like is too great a distance to carry the reservoir 11, a funnel may be inserted in the opening 13 of the top of the reservoir, and the same filled from buckets of water. However, the reservoir may be filled in any suitable manner as desired. The filling opening is provided with a circumferential threaded flange 14 to be engaged by a threaded closure member 15. The wall of the reservoir adjacent its lower portion, that is, close to the pan or fountain, is provided with an extremely small orifice 16, which may be opened or closed by a suitable slide 17, which is mounted in the guide 18. This slide or closure is provided with a lateral extending portion 19 constituting a hand grip, whereby the slide may be opened or closed.

In Fig. 5 the clamps and the flange 6 are dispensed with, in which case the reservoir 11 only rests upon the pan or fountain, and may be easily detached by just lifting the same.

From the foregoing it will be observed that there is provided a simple and efficient drinking fountain or waterer for fowls and the like, and one in which the reservoir is provided with detachable means for connecting the same to the pan, in order to insure sanitation, and also one in which the pan or fountain is provided with means to permit all fowls to easily reach the water, especially miniature fowl.

The orifice of the reservoir is of such a size, and the slide closure therefor may be so adjusted, that the water may slowly pass from the reservoir into the pan or fountain, without overflowing the same. However, when it appears that the fowls are not very thirsty, or that they are not frequenting the fountain very often the slide closure may be closed, thereby insuring against any possible overflowing of the fountain.

The invention having been set forth, what is claimed as new and useful is:—

A drinking fountain for fowls and the like comprising a pan fountain, a reservoir provided with means for gradually regulating the flow of water from the reservoir to the pan fountain, said pan fountain having an annular flange T-shaped in cross section and rising therefrom, and above which the reservoir is supported, a plurality of clamps having arms corresponding in shape to the T-shaped flange and engaging therewith, said reservoir having a peripheral flange at its bottom, said clamps having arms overlying the peripheral flange of the reservoir for detachably clamping the reservoir in place, said clamps having additional arms, whereby one or the other of the clamps may be moved or adjusted upon the T-shaped flange to permit the reservoir to be detached, said pan fountain having means to permit the fowls to reach the water.

In testimony whereof I have signed my name to this specification in the presence of two subscribing witnesses.

ELIZABETH BLUMER.

Witnesses:
CLAUDIA E. TURNER,
J. V. GRAMMER.

Copies of this patent may be obtained for five cents each, by addressing the "Commissioner of Patents, Washington, D. C."